US011161655B2

(12) United States Patent
Hoskins et al.

(10) Patent No.: US 11,161,655 B2
(45) Date of Patent: Nov. 2, 2021

(54) MULTI-POSITION VALVES

(71) Applicant: TSI Manufacturing LLC, Bend, OR (US)

(72) Inventors: Matthew Hoskins, Bend, OR (US); Robert Smith, Bend, OR (US)

(*) Notice: Subject to any disclaimer, the term of this patent is extended or adjusted under 35 U.S.C. 154(b) by 58 days.

(21) Appl. No.: 16/687,040

(22) Filed: Nov. 18, 2019

(65) Prior Publication Data

US 2020/0290781 A1    Sep. 17, 2020

Related U.S. Application Data (60) Provisional application No. 62/816,740, filed on Mar. 11, 2019.

(51) Int. Cl.
| | | |
|---|---|---|
| *B65D 47/06* | (2006.01) | |
| *F16K 15/18* | (2006.01) | |
| *A45F 3/16* | (2006.01) | |
| *B65D 47/20* | (2006.01) | |

(52) U.S. Cl.
CPC .............. *B65D 47/063* (2013.01); *A45F 3/16* (2013.01); *B65D 47/205* (2013.01); *F16K 15/188* (2013.01)

(58) Field of Classification Search
CPC ....... B65D 47/063; B65D 47/205; A47F 3/16; F16K 31/445; F16K 31/58; F16K 15/188
See application file for complete search history.

(56) References Cited

U.S. PATENT DOCUMENTS

| | | | | |
|---|---|---|---|---|
| 6,742,681 B1* | 6/2004 | Yang | ................... | B65D 47/247 |
| | | | | 220/703 |
| 7,621,294 B2* | 11/2009 | Wang | ....................... | A45F 3/20 |
| | | | | 137/613 |
| 9,844,285 B2* | 12/2017 | Hoskins | ............ | B65D 47/2037 |
| 2014/0144944 A1* | 5/2014 | Rogers | .................... | F16K 19/00 |
| | | | | 251/342 |

* cited by examiner

*Primary Examiner* — Jessica Cahill
*Assistant Examiner* — Patrick C Williams
(74) *Attorney, Agent, or Firm* — Klarquist Sparkman, LLP (57) ABSTRACT

A valve assembly includes a housing, a collar, a sheath fixedly coupled to the collar, and a stem assembly. The collar and the sheath can be axially moveable relative to the housing between a first position, a second position, and a third position. In the first position, a fluid inside a lumen of the housing can be blocked from flowing into a lumen of the collar. In the second position, the fluid inside the lumen of the housing can flow through the lumen of the collar and into a chamber of the sheath. The fluid can be retained therein or flow out of the sheath through an aperture when the sheath is selectively deformed. In the third position, the fluid inside the lumen of the housing can flow through the lumen of the collar and the chamber, and then flow out of the sheath unobstructed through the aperture.

20 Claims, 7 Drawing Sheets

MULTI-POSITION VALVES

CROSS-REFERENCE TO RELATED APPLICATIONS

This application claims priority to U.S. Provisional Patent Application No. 62/816,740, filed Mar. 11, 2019, which is incorporated herein by reference.

FIELD

This disclosure is related to valves for dispensing fluid from drinking containers.

BACKGROUND

Sufficient hydration is important for replacing bodily fluids during periods of aerobic activity, such as during cycling. A person engaged in aerobic activity could stop the aerobic activity and take a drink, such as at aid stations. However, this disrupts the aerobic activity and is not well suited for events like competitive cycling races.

It is desirable to make replenishment fluid available without the need to slow or stop aerobic activity. Water bottles carried by persons engaged in aerobic activity represent an attempt to overcome the problems associated with aid stations. However, water bottles can be awkwardly shaped and at least one hand is required for as long as one is drinking from the water bottle. Therefore, the use of water bottles can present safety hazards to cyclists and other active individuals.

In an attempt to overcome the deficiencies of water bottles, hydration systems have been developed that include a flexible reservoir for holding fluid, a flexible tube for conveying the fluid from the reservoir to the person engaged in aerobic activity, and a valve, such as a mouth operated "bite valve," attached to the end of the tube. In the case of a bite valve, when it is desired to replenish fluids, the person engaged in aerobic activity places the outlet of the valve in his or her mouth and bites down on a flexible sheath. The sheath deforms and is taken out of sealing engagement with an internal stem, and fluid from the reservoir flows into the person's mouth. However, bite valves can be subject to wear as the flexible portion (typically made of polymeric material) tends to weaken over extended use. If weakened, the valves may experience difficulty in maintaining a closed position when the biting force is removed, and thus may leak. Furthermore, a typical bite valve cannot be adjusted to an "always open" position to allow for free flow through the valve. As such, there is a need for improved valves for hydration systems.

SUMMARY

Disclosed herein are exemplary embodiments of multi-position valves, such as for drinking from a portable fluid container. Disclosed valves allow for manual actuation of the valve between three or more positions, including a closed position, a selectively open position where a user can obtain fluid through the valve by selectively actuating a bite valve, and a fully open position where the bite valve is disengaged to permit free flow of fluid through the valve.

Certain embodiments of the disclosure concern a valve assembly. The valve assembly can include a housing, a collar movably coupled to the housing, a sheath coupled to the collar, and a stem assembly positioned inside the housing, the collar, and the sheath. The collar can be axially moveable relative to the housing between a first position, a second position, and a third position. When the collar is in the first position, the stem assembly can be configured to block a fluid inside a lumen of the housing from flowing into a lumen of the collar. When the collar is in the second position, the stem assembly can be configured to allow the fluid to flow from the lumen of the housing through the lumen of the collar and into a chamber of the sheath, and the stem assembly can be further configured to retain the fluid inside the chamber of the sheath when an aperture of the sheath is blocked by the stem assembly or allow the fluid to flow out of the sheath through the aperture when the sheath is selectively deformed around the stem assembly. When the collar is in the third position, the stem assembly can be configured to allow the fluid to flow from the lumen of the housing through the lumen of the collar and into the chamber of the sheath, and then flow out of the sheath unobstructed through the aperture.

In some embodiments, the stem assembly can include a bias member which can be compressed to a biased position by moving the collar toward the housing or return to an unbiased position by pushing the collar away from the housing.

In some embodiments, the collar can be in the first position when the bias member is in the biased position, and the collar can be in the second or third position when the bias member is in the unbiased position.

In some embodiments, a distal end portion of the stem assembly can include a plug and a proximal end portion of the stem assembly can include a disk. When the collar is in the first position, the plug of the stem assembly can be configured to seal an orifice of the lumen of the housing. When the collar is in the second position, the plug of the stem assembly can be configured to unseal the orifice of the lumen of the housing and the disk of the stem assembly is configured to seal the aperture of the sheath. When the collar is in the third position, the plug of the stem assembly can be configured to unseal the orifice of the lumen of the housing and the disk of the stem assembly can be configured to unseal the aperture of the sheath.

In some embodiments, the collar can be threadably coupled to a body portion of the housing such that rotating the collar in a first direction can cause the collar to move distally relative to the housing and rotating the collar in a second direction that is opposite to the first direction can cause the collar to move proximal relative to the housing.

In some embodiments, the stem body can include a protruding member extending into and moveable within a slot of the housing. The slot can have a proximal end and a distal end.

In some embodiments, the distal end of the slot can be so positioned that it allows the stem body to move distally at least to an extent where a plug of the stem assembly can seal an orifice of the lumen of the housing.

In some embodiments, the collar can include a pin extending into and moveable within to a slot located on the housing. The slot can have a proximal end and a distal end.

In some embodiments, the collar can be in the first position when the pin of the collar is moved to the distal end of the slot, and the collar can be in the third position when the pin of the collar is moved to the proximal end of the slot.

In some embodiments, the collar can be in the second position when the pin of the collar is moved to an intermediate point that is between the proximal end and the distal end of the slot.

Certain embodiments of the disclosure also concerns a valve assembly that can include a housing, a collar movably coupled to the housing, a sheath fixedly coupled to the collar, and a stem assembly fixedly coupled to the housing. The stem assembly can include a bias member which can be compressed to a biased position by moving the collar toward the housing or return to an unbiased position by pushing the collar away from the housing. When the bias member is in the biased position, the stem assembly can be configured to block a fluid inside a lumen of the housing from flowing into a lumen of the collar. When the bias member is in the unbiased position, the stem assembly can be configured to allow the fluid to flow from the lumen of the housing through the lumen of the collar and into a chamber of the sheath, and the collar can be further configured to be moveable between a first position and a second position. When the collar is in the first position, the stem assembly can be configured to retain the fluid inside the chamber of the sheath when an aperture of the sheath is blocked by the stem assembly or allow the fluid to flow out of the sheath through the aperture when the sheath is selectively deformed around the stem assembly. When the collar is in the second position, the stem assembly can be configured to allow the fluid to flow out of the sheath unobstructed through the aperture.

In some embodiments, the a distal end portion of the stem assembly can include a plug and a proximal end portion of the stem assembly can include a disk. When the bias member is in the biased position, the plug of the stem assembly can be configured to seal an orifice of the lumen of the housing. When the collar is in the first position, the plug of the stem assembly can be configured to unseal the orifice of the lumen of the housing and the disk of the stem assembly can be configured to seal the aperture of the sheath. When the collar is in the second position, the plug of the stem assembly can be configured to unseal the orifice of the lumen of the housing and the disk of the stem assembly can be configured to unseal the aperture of the sheath.

In some embodiments, the housing can include an inlet portion and an outlet portion. The inlet portion can be pivotably coupled to the outlet portion. The inlet portion can include an inlet conduit that can be fluidly coupled to a fluid reservoir, and the outlet portion can include an outlet conduit that is fluidly coupled to the inlet conduit.

In some embodiments, when the bias member is in the biased position, the collar can be configured to frictionally engage a body portion of the housing so as to counter a bias force applied by the bias member so as to prevent the collar from moving away from the housing.

In some embodiments, the valve assembly can further include a set of complimentarily arranged bumps and indents located on the collar and the housing so as to provide friction points when the bias member is in the biased position.

In some embodiments, the housing can include one or more magnetic members that are configured for releasably attaching the valve assembly to a complementary magnetic surface.

Also disclosed herein is a valve assembly that can include a housing, a collar movably coupled to the housing, a sheath fixedly coupled to the collar, and a stem assembly fixedly coupled to the housing. The housing can include a lumen having an orifice. A distal end portion of the stem assembly can include a plug and a proximal end portion of the stem assembly can include a disk. The collar can be configured to be axially moveable relative to the housing between a first position, a second position, and a third position. When the collar is in the first position, the plug of the stem assembly can be configured to seal the orifice of the lumen of the housing. When the collar is in the second position, the plug of the stem assembly can be configured to unseal the orifice of the lumen of the housing and the disk of the stem assembly can configured to seal an aperture of the sheath. When the collar is in the third position, the plug of the stem assembly can be configured to unseal the orifice of the lumen of the housing and the disk of the stem assembly can be configured to unseal the aperture of the sheath.

In some embodiments, the stem assembly can include a bias member which can be compressed to a biased position by moving the collar toward the housing or return to an unbiased position by pushing the collar away from the housing. The collar can be in the first position when the bias member is in the biased position, and the collar can be in the second or third position when the bias member is in the unbiased position.

In some embodiments, when the collar is in the first position, a distal end of the collar can abut a shoulder which extends outwardly from an outer surface of the housing. When the collar is in the second position, the distal end of the collar can be separated from the shoulder by a first predefined distance. When the collar is in the third position, the distal end of the collar can be separated from the shoulder by a second predefined distance. The second predefined distance can be larger than the first predefined distance.

In some embodiments, the collar can be rotatably coupled to a portion of the housing such that rotating the collar in a first direction can cause the collar to move distally relative to the housing and rotating the collar in a second direction that is opposite to the first direction can cause the collar to move proximal relative to the housing. An external surface of the housing can include a marker and an external surface of the collar can include a complementary marker. An alignment of the marker on the housing with the complementary marker on the collar can indicate that the collar is in the first position, the second position, or the third position.

SUMMARY

Figure 6:
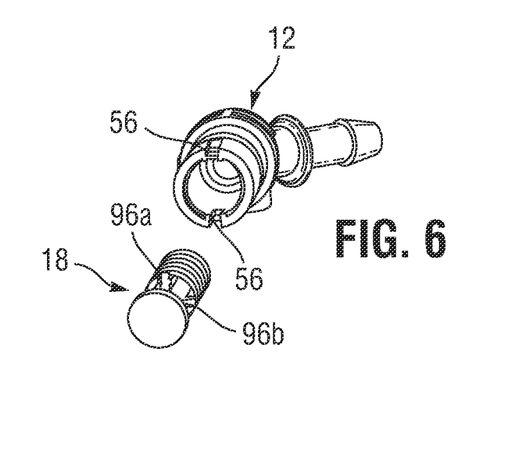
FIG. 6 is a perspective view of a stem assembly and a housing of the valve of FIG. 1.

FIGS. 1-4 show an exemplary multi-position valve 10, according to one embodiment. As shown, the multi-position valve 10 includes a housing 12, a sheath 16, a collar 14 located between the housing 12 and the sheath 16, and a stem assembly 18 mounted inside the housing 12, the collar 14 and the sheath 16. FIGS. 7-11 show several perspective exploded views of the multi-position valve 10. In addition, FIG. 6 shows a perspective view of the stem assembly 18 separated from the housing 12.

As used herein, with respect to various components of the multi-position valve 10, "proximal" refers to a position, direction, or portion of a device that is closer to the sheath 16 and further away from the housing 12, while "distal" refers to a position, direction, or portion of a device that is further away from the sheath 16 and closer to the housing 12. The terms "longitudinal" and "axial" refer to an axis extending in the proximal and distal directions, unless otherwise expressly defined.

Figure 1:
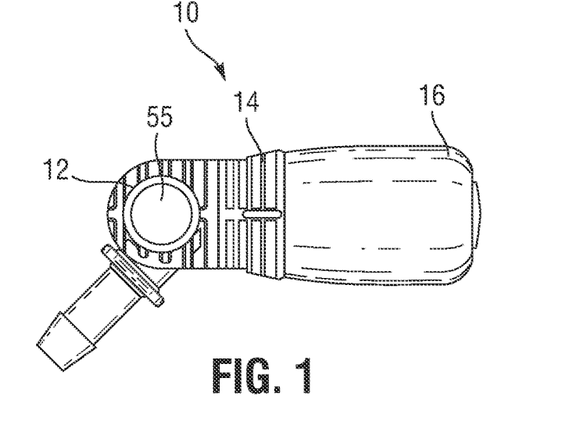
FIG. 1 is a side elevation view of a multi-position valve according to one embodiment.
Figure 2:
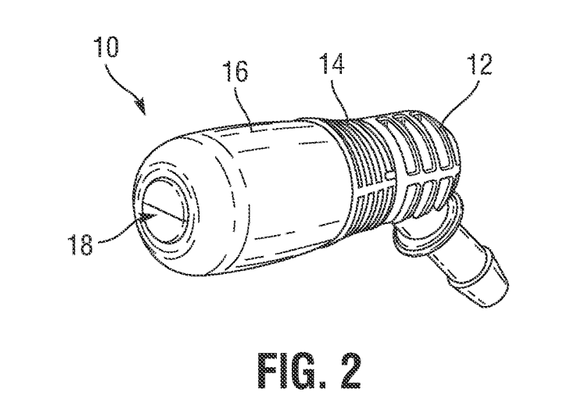
FIG. 2 is a side perspective view of the valve of FIG. 1.
Figure 3:
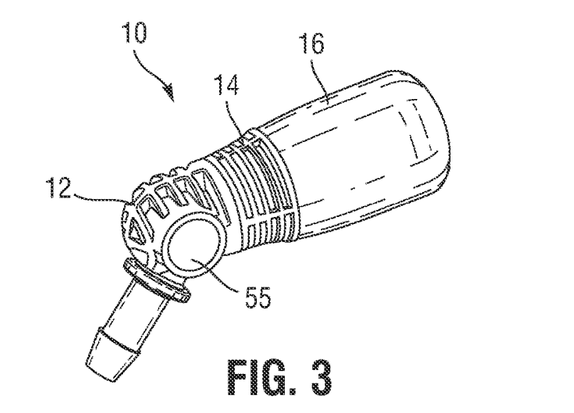
FIG. 3 is another side perspective view of the valve of FIG. 1.
Figure 4:
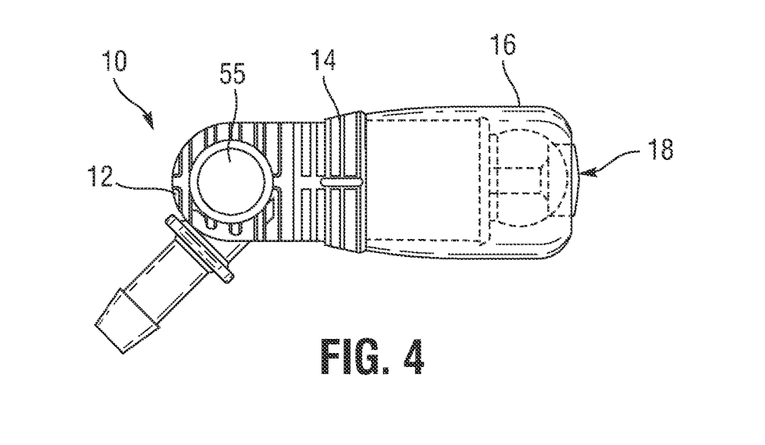
FIG. 4 is another side elevation view of the valve of FIG. 1 with the sheath portion of the valve being depicted as partially translucent.
Figure 5:
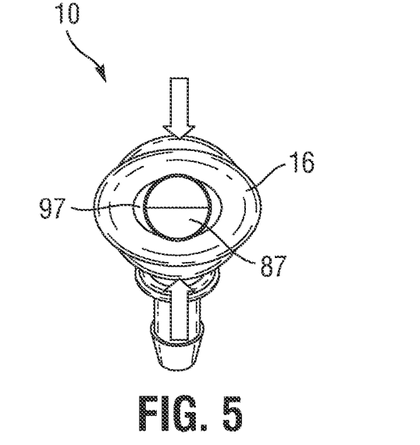
FIG. 5 is a front view of the valve of FIG. 1.
Figure 12:
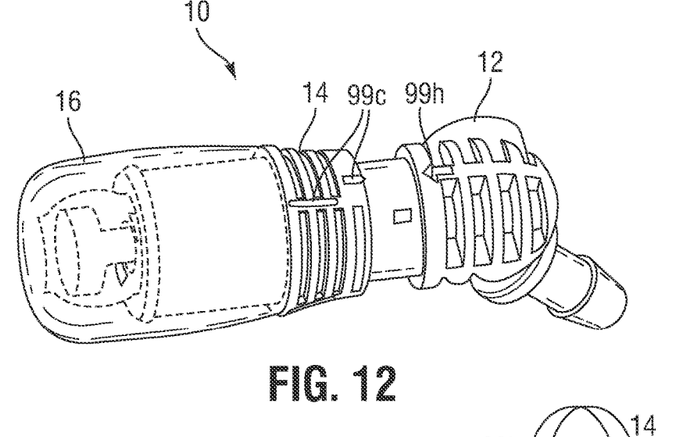
FIG. 12 is a side perspective view of the valve of FIG. 1, the valve being configured in the free-flow mode.
Figure 13:
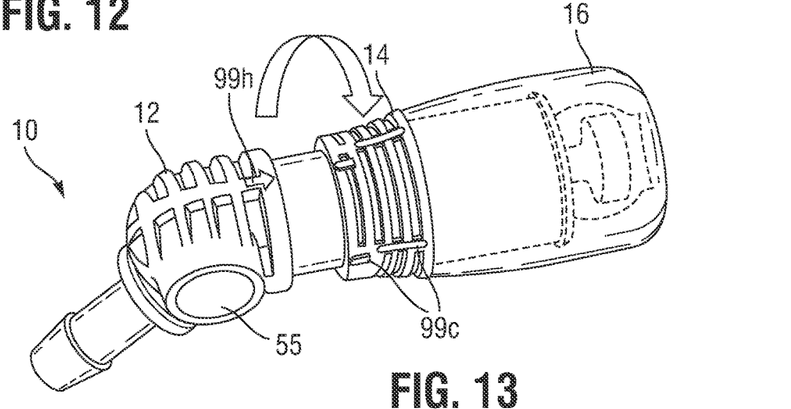
FIG. 13 is another side perspective view of the valve of FIG. 1, the valve being configured in the free-flow mode.
Figure 14:
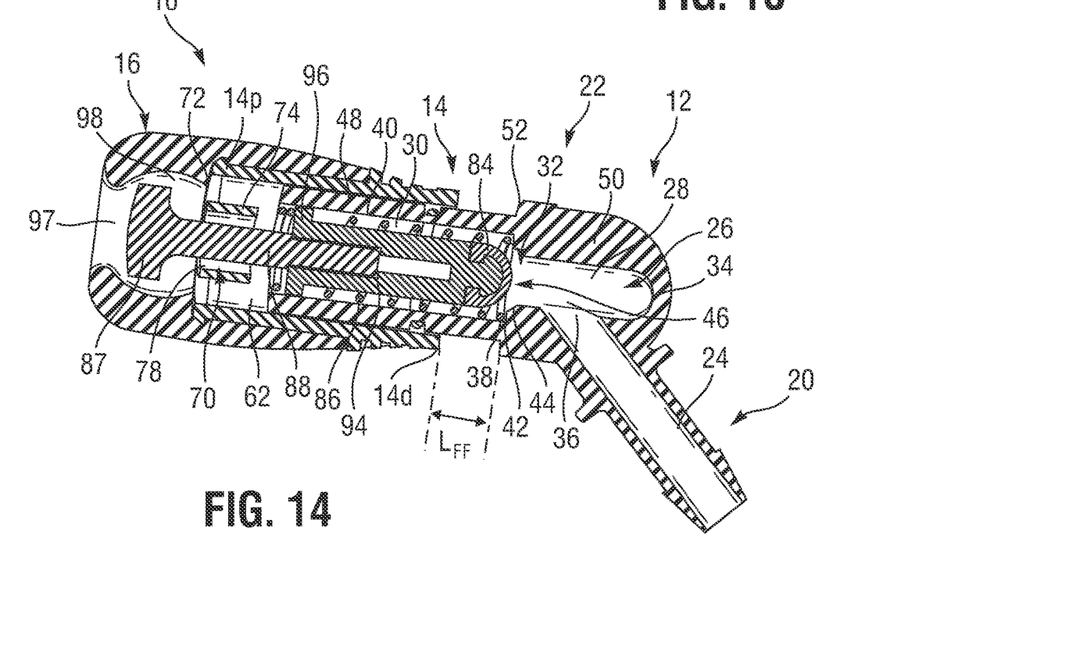
FIG. 14 is a side cross-sectional view of the valve of FIG. 1, the valve being configured in the free-flow mode.
Figure 15:
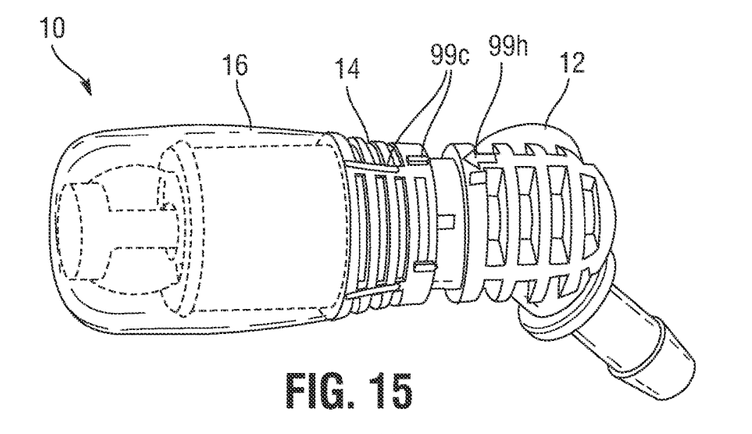
FIG. 15 is a side perspective view of the valve of FIG. 1, the valve being configured in the bite-valve mode.
Figure 16:
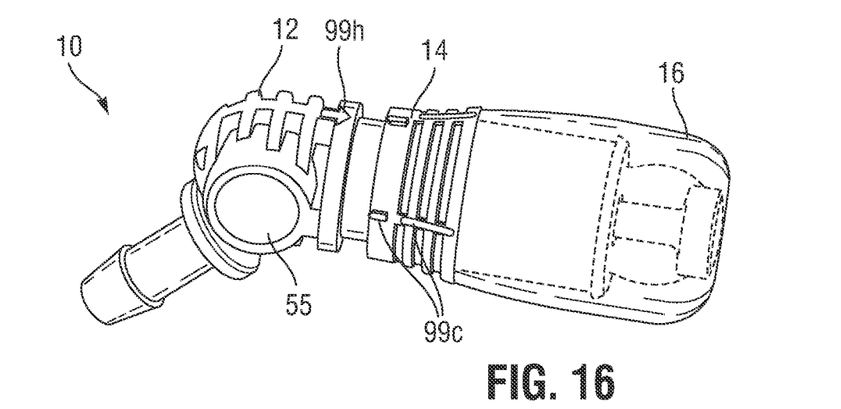
FIG. 16 is another side perspective view of the valve of FIG. 1, the valve being configured in the bite-valve mode.
Figure 17:
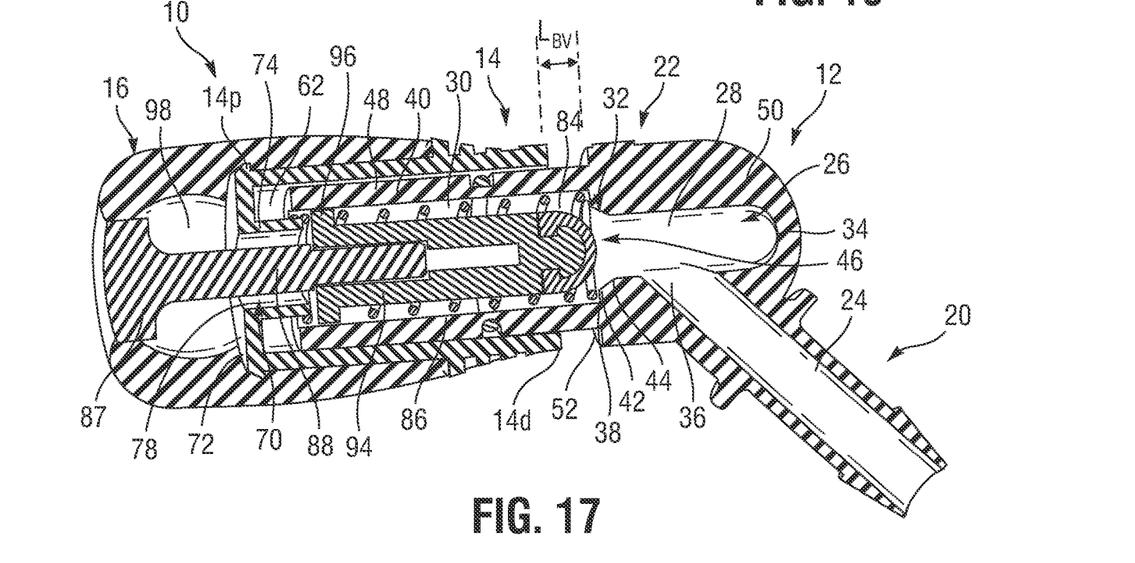
FIG. 17 is a side cross-sectional view of the valve of FIG. 1, the valve being configured in the bite-valve mode.
Figure 18:
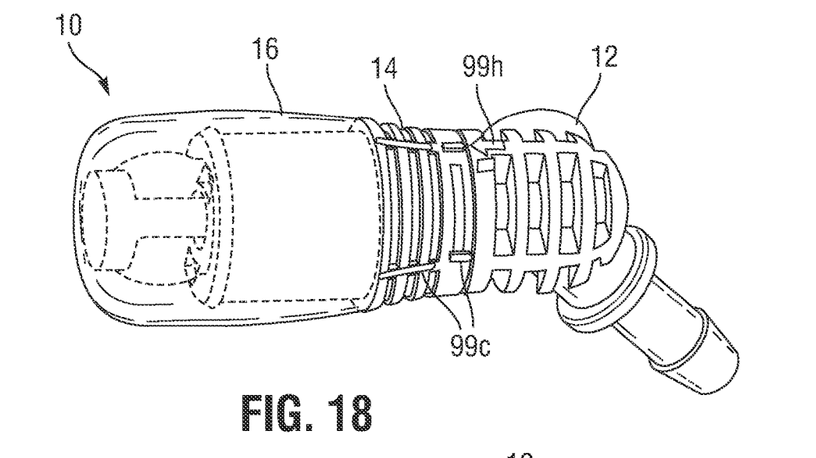
FIG. 18 is a side perspective view of the valve of FIG. 1, the valve being configured in the OFF mode.
Figure 19:
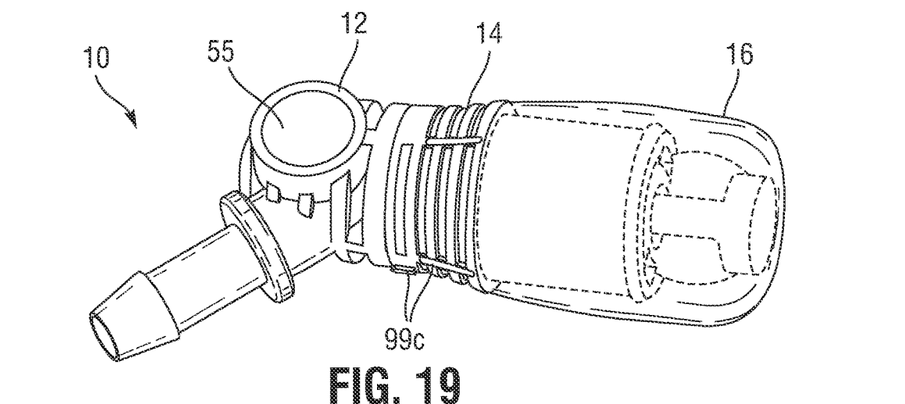
FIG. 19 is another side perspective view of the valve of FIG. 1, the valve being configured in the OFF mode.
Figure 20:
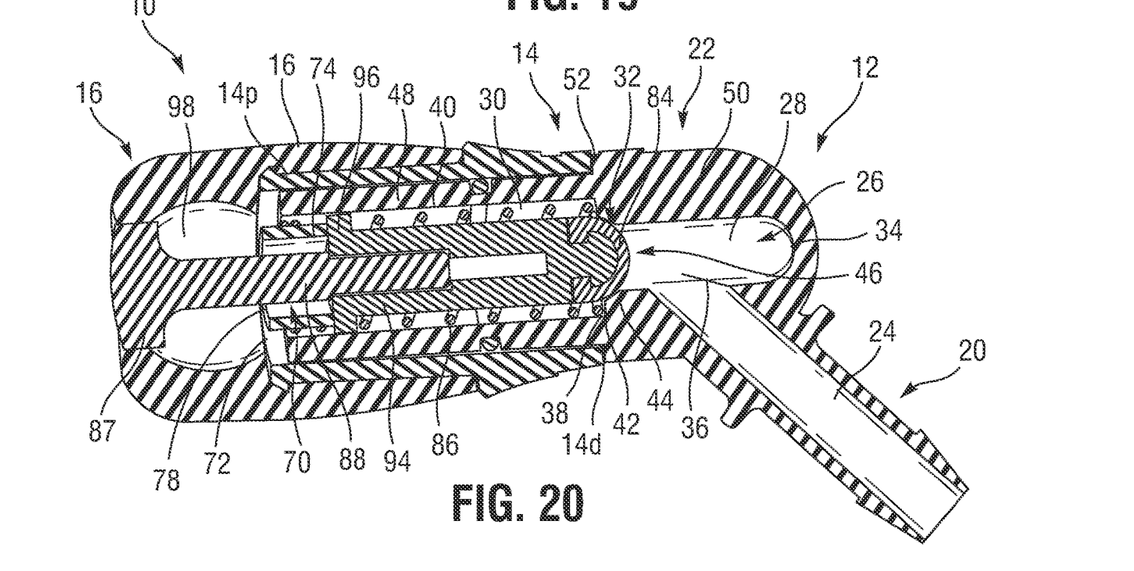
FIG. 20 is a side cross-sectional view of the valve of FIG. 1, the valve being configured in the OFF mode.

FIGS. 12-20 illustrate three different operation modes of the multi-position valve 10. Specifically, FIGS. 12-14 illustrate the valve 10 in free-flow mode, FIGS. 15-17 illustrate the valve 10 in bite-valve mode, and FIGS. 18-20 illustrate the valve 10 in OFF mode. In addition, FIG. 5 shows the front view of the valve 10 in bite-valve mode when the sheath 16 is radially compressed. Operation of the multi-position valve 10 is disclosed more fully after describing various structural components below.

Housing

As illustrated in FIGS. 14, 17 and 20, the housing 12 can include an inlet portion 20 and an outlet portion 22. In some embodiments, the inlet portion 20 can be pivotably coupled to the outlet portion 22 such that the inlet portion 20 can pivot relative to the outlet portion 22.

The inlet portion 20 can be fluidly coupled to the outlet portion 22 through an inner passageway. For example, as shown in FIGS. 14, 17 and 20, the inlet portion 20 can have an inlet conduit 24 that can be fluidly coupled to a fluid reservoir (not shown) through a flexible tube (not shown). The outlet portion 22 can have an outlet conduit 26 that is fluidly coupled to the inlet conduit 24.

The outlet conduit 26 can include a distal lumen 28 and a proximal lumen 30 connected at a transition region 32. Both the distal lumen 28 and the proximal lumen 30 can be tubular and their cross-sections can be any shape, such as circle, oval, rectangle, etc. The sidewall 34 of the distal lumen 28 can have an opening 36 which is aligned with the inlet conduit 24, allowing fluid flow into the outlet conduit 26 from the inlet conduit 24.

The proximal lumen 30 can have a larger radial dimension (e.g., diameter if the cross-section has a circular shape) than the distal lumen 28. The transition region 32 can have an inner shoulder 38 that extends radially inwardly and is generally perpendicular to the sidewall 40 of the proximal lumen 30. The inner edge 42 of the inner shoulder 38 forms an orifice 46 through which the fluid can flow from the distal lumen 28 into the proximal lumen 30. The transition region 32 can further include a sloped surface 44 extending between the inner edge 42 of the inner shoulder 38 and the sidewall 34 of the distal lumen 28.

As shown in FIGS. 14, 17 and 20, the outlet portion 22 can include a proximal body 48 fixedly connected to a distal body 50. In the depicted embodiments, the proximal body 48 encloses the proximal lumen 30 of the outlet conduit 26, and the distal body 50 encloses the distal lumen 28 as well as the transition region 32 of the outlet conduit 26. In other embodiments (not shown), the proximal lumen 30 and/or the transition region 32 may extend into the distal body 50. Yet in alternative embodiments (not shown), the distal lumen 28 and/or the transition region 32 may extend into the proximal body 48.

Both the proximal body 48 and the distal body 50 can have a cylindrical shape, and the proximal body 48 can have a smaller diameter than the distal body 50. As such, the proximal end of the distal body 50 can form an outer shoulder 52 that extends outwardly relative to, and is generally perpendicular to, the outer surface of the proximal body 48. In the depicted embodiments, the outer shoulder 52 is generally aligned with the inner shoulder 38 in the axial direction. In other embodiments (not shown), the outer shoulder 52 may have a proximal or distal offset relative to the inner shoulder 38.

Figure 7:
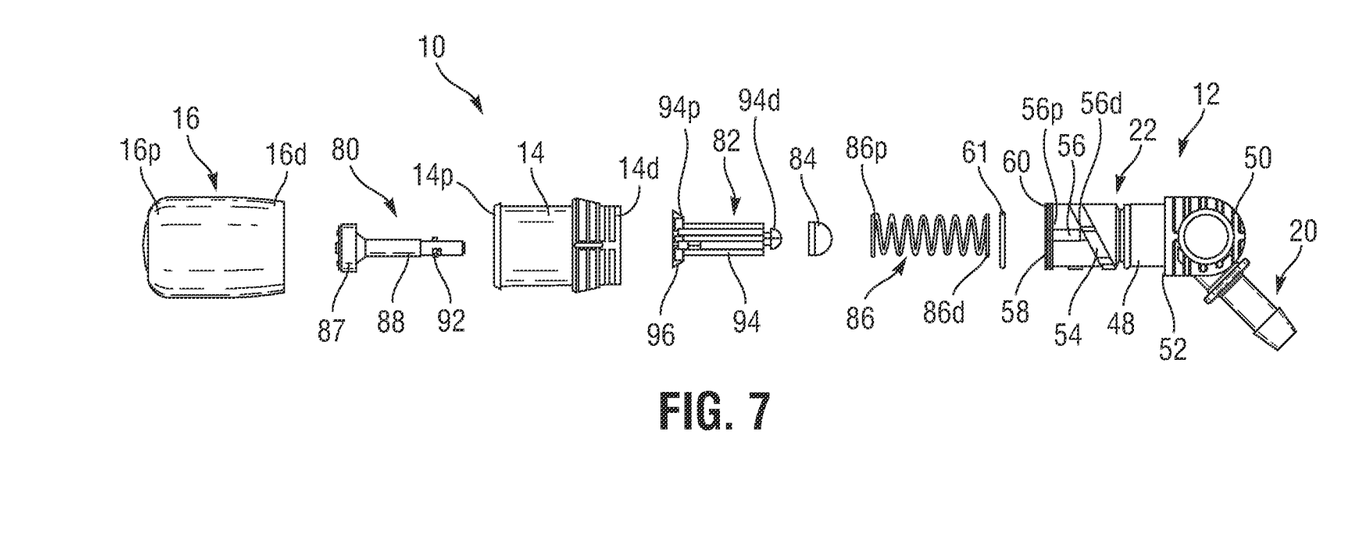
FIG. 7 is an exploded view of the valve of FIG. 1.

As shown in FIGS. 7-11, the proximal body 48 can have an external thread 54. As described more fully below, the proximal body 48 can be configured to threadably engage with the collar 14. In some embodiments, the proximal body 48 can include a retaining mechanism that is configured to secure the stem assembly 18. For example, a plurality of dead-end slots 56 (e.g., two are illustrated in FIGS. 6-7) can be located adjacent the proximal end 58 of the outlet portion 22. Such slots 56 can be configured to capture corresponding protruding members of the stem assembly 18 and allow limited axial movement of the stem assembly 18 relative to the outlet portion 22 as described more fully below. In addition, the proximal end 58 of the outlet portion 22 can include a seal groove 60 which is configured to matingly receive a seal member 61, such as an O-ring gasket.

In some embodiments, the multi-position valve 10 can comprise one or more magnetic members 55 on one or more surfaces of the housing 12 for releasably attaching the valve 10 to a complementary magnetic surface. In some embodiments, one or more of the magnetic members 55 can be fixedly attached to the surfaces of the housing 12, e.g., by welding, adhesive, etc. In some embodiments, one or more of the magnetic members 55 can be releasably attached to the surfaces of the housing 12, e.g., by magnetic coupling to a metal piece fixed on the housing, or hook-and-loop fasteners, etc.

The complementary magnetic surface may be located on an item worn by a user, such as shoulder strap of a fluid reservoir, such that the valve 10 can be attached to the magnetic surface and stored at a convenient location when not in use. The complementary magnetic surface can also be located on a bicycle or other exercise equipment, such as in the vicinity of a handlebar of a bicycle. In such uses, the valve 10 typically is connected to a fluid container by a flexible conduit, one end of which can be coupled to the inlet portion 20 of the valve 10.

Instead of magnetic materials, the disclosed multi-position valve can also comprise a variety of other non-magnetic attachment means as known to those skilled in the art, such as hook-and-loop fasteners or mechanical fasteners, to releasably attach the valve to another surface when not in use.

Collar

The collar 14 can be made of a rigid material and is coupled to the proximal body 48 of the outlet portion 22 of the housing 12. As shown in FIGS. 14, 17 and 20, the collar 14 can have a generally tubular body that defines a central lumen 62, which is sized such that the proximal body 48 can be inserted into the central lumen 62 through a distal opening 64 of the collar 14.

The collar 14 is configured to be rotatable, and axially moveable, relative to the housing 12. In particular embodiments, the collar 14 can be threadably coupled to the proximal body 48 such that a rotation or twisting (e.g., clockwise or counter-clockwise) of the collar 14 relative to the housing 12 can be translated into axial movement (e.g., proximal or distal, or vice versa) of the collar 14 relative to the housing 12.

Figure 9:
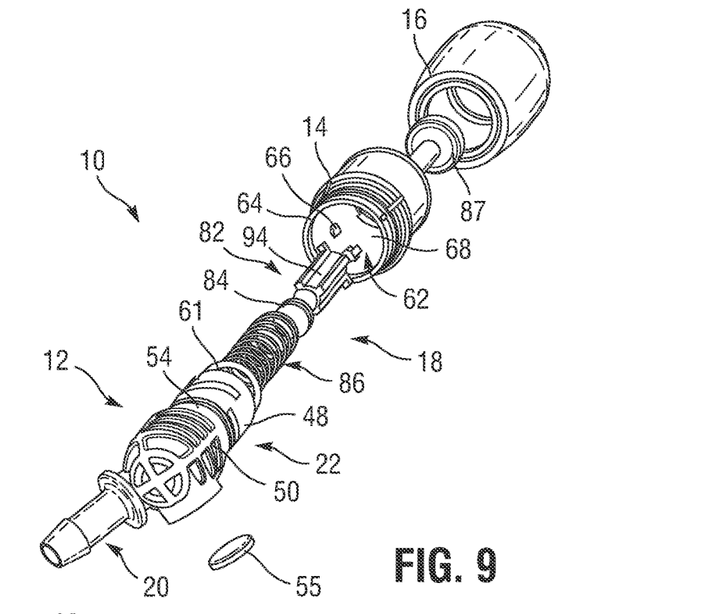
FIG. 9 is a third exploded view of the valve of FIG. 1.
Figure 10:
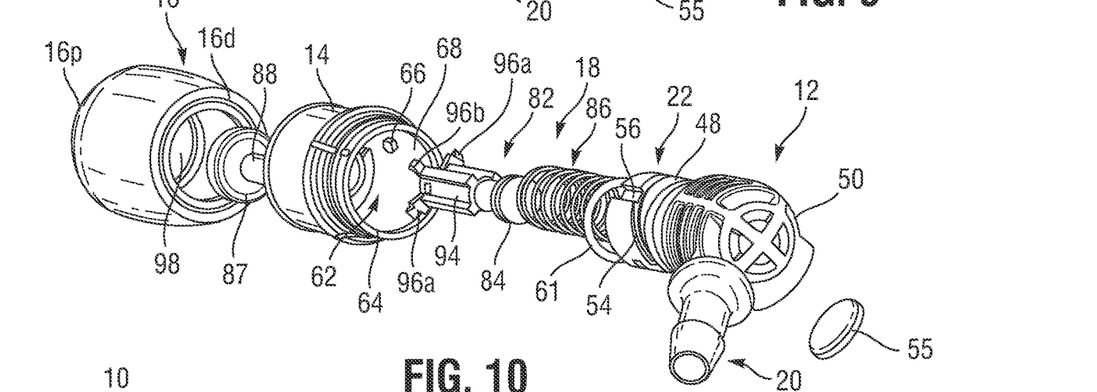
FIG. 10 is a fourth exploded view of the valve of FIG. 1.
Figure 11:
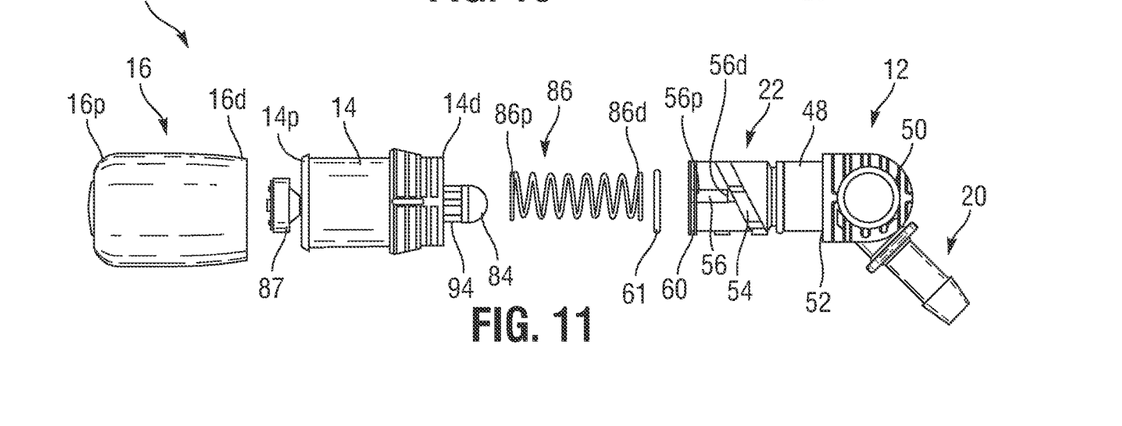
FIG. 11 is a fifth exploded view of the valve of FIG. 1.

For example, in the embodiments shown in FIGS. 9-10, the collar 14 have two opposing pins 66 extending radially inwardly from the sidewall 68 of the central lumen 62, and the external thread 54 is configured as a pair of helical dead-end slots. The pins 66 are configured to track within the external thread 54 on the proximal body 48 such that a degree of rotation of the collar 14 can result in axial advancement (i.e., move proximally) or retraction (i.e., move distally) of the collar 14 relative to the housing 12 by a set distance. In alternative embodiments (not shown), the collar 14 can have an internal thread that is configured to matingly engage the external thread 54.

In other embodiments (not shown), the rotation-to-translation movement of the collar 14 can be replaced with a simple push and/or pull mechanism where the collar 14 can move axially relative to the housing 12 simply by pushing and pulling it axially, without rotation.

The external thread 54 on the proximal body 48 can limit the axial movement of the collar 14. As shown in FIG. 7, a proximal end 54p and a distal end 54d of the external thread 54 can define the most proximal and distal positions to which the collar 14 can advance and retract, respectively.

For example, in certain embodiments, the distal end 54d of the external thread 54 is positioned such that when the collar 14 is retracted to the most distal position, the distal end 14d of the collar 14 abuts the outer shoulder 52 of the distal body 50, as depicted in FIGS. 1-4 and 18-20.

In certain embodiments, the proximal end 54p of the external thread 54 is positioned such that when the collar 14 is advanced to the most proximal position, the distal end 14d of the collar 14 is separated from the outer shoulder 52 by a predefined distance $L_{FF}$, as illustrated in FIG. 14.

In certain embodiments, the collar 14 also has a neutral position that is somewhere between its most proximal position and most distal position. When the collar 14 is in its neutral position, the distal end 14d of the collar 14 is separated from the outer shoulder 52 by another predefined distance $L_{BV}$ (see e.g., FIG. 17), which is smaller than $L_{FF}$.

As shown in FIGS. 14, 17 and 20, the collar 14 can further have an end cap 70, which includes an end plate 72 located at the proximal end 14p of the collar 14 and a tubular body 74 extending from the end plate 72 and into the central lumen 62. As such, the end plate 72 and the central passage 76 of the tubular body 74 define a proximal opening 78 of the collar 14. The diameter of the proximal opening 78 is smaller than that of the distal opening 64. As described more fully below, the end cap 70 can urge the stem assembly 18 to move distally when the collar 14 is retracted toward the distal body 50 of the housing 12.

Stem Assembly

In the embodiments shown in FIGS. 7-11, the stem assembly 18 includes a stem tip 80, a stem body 82, a stem plug 84, and a bias member 86. In addition, the stem assembly 18 can further include a seal member 61 (e.g., an O-ring gasket) which can be received by the seal groove 60 located at the proximal end 58 of the outlet portion 22 to effect a seal between the outlet portion 22 and the interior wall of the collar 14 and prevent fluid leakage. For an assembled multi-position valve 10, the stem assembly 18 is enclosed within the sheath 16 and can extend through the collar 14 where it is secured between the collar 14 and the housing 12.

As shown, the stem tip 80 can include a disk 87 and a neck 88 extending distally from the disk 87. The proximal opening 78 of the collar 14 has a larger diameter than the neck 88 so that when the neck 88 is inserted into the central lumen 62 of the collar 14 through the proximal opening 78, fluid inside the central lumen 62 can flow into the sheath 16 through the proximal opening 78. In the depicted embodiments, the neck 88 of the stem tip 80 can be inserted into a lumen 90 of the stem body 82.

Figure 8:
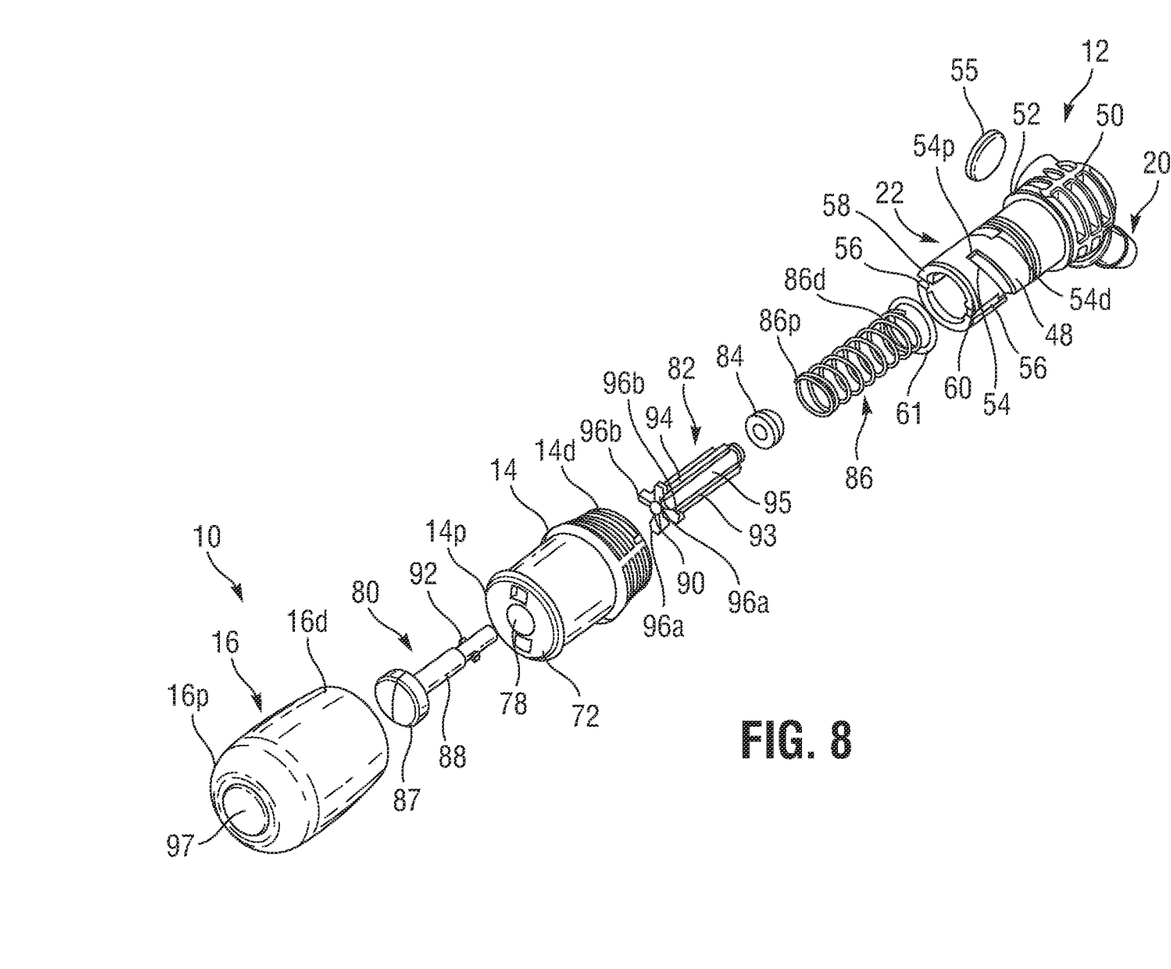
FIG. 8 is second exploded view of the valve of FIG. 1.

The stem tip 80 is configured to anchor to the stem body 82. For example, the stem tip 80 can have a plurality of protrusions 92 (e.g., two are shown in FIGS. 7-8) extending radially outwardly from the neck 88, and the protrusions 92 can be configured to matingly engage respective recesses (not shown) on the sidewall of the lumen 90. Other retention mechanisms (e.g., friction fit, tongue-in-groove lock, etc.) can also be employed so long as the stem tip 80 can be securely anchored to the stem body 82.

The stem body 82 can have a shaft 94 and a spring-stop feature 96 located at the proximal end 94p of the shaft 94. In some embodiments, the shaft 94 can include a plurality of ribs 93 over the outer surface of the shaft 94, and such ribs can form a plurality of fluid channels 95 extending along the longitudinal axis of the shaft 94.

As shown in FIGS. 7-10, the spring-stop feature 96 can include a plurality of arms 96a (e.g., two are shown in the figures) extending radially outwardly from the shaft 94. In the depicted embodiments, the radial length of the arms 96a is smaller than the radius of the distal opening 64 such that the stem body 82 can be inserted therefrom and into the central lumen 62 of the collar 14. On the other hand, the radial length of the arms 96a is larger than the radius of the tubular body 74 of the end cap 70 such that the end cap 70 can urge the stem body 82 to move distally when the collar 14 is retracted toward the distal body 50 of the housing 12.

In addition, the spring-stop feature 96 can also include a plurality of protruding members 96b (e.g., two are shown in the figures) that extend radially outwardly from the shaft 94. In the depicted embodiments, the stem body 82 can be inserted into the proximal lumen 30 of the outlet conduit 26.

In addition, the protruding members 96b can extend outwardly through respective dead-end slots 56 located adjacent the proximal end 58 of the outlet portion 22, thereby coupling the stem body 82 and the outlet portion 22 together. The length of the dead-end slots 56 is defined by its proximal end 56p and distal end 56d, and the length of the slots 56 can limit the range of axial movement of the stem body 82 relative to the outlet portion 22.

In the embodiments depicted in FIGS. 6-11, the bias member 86 is a compression spring, which can coil around the stem body 82. The distal end 86d of the bias member 86 is positioned inside the outlet conduit 26 and can abut the inner shoulder 38 of the transition region 32. In some embodiments, the distal end 86d of the bias member 86 can be fixedly attached to the inner shoulder 38. The proximal end 86p of the bias member 86 is configured to anchor to the spring-stop feature 96 of the stem body 82. For example, the arms 96*a* and/or the protrusion members 96*b* can extend radially outwardly and between adjacent spring coils near the proximal end 86*p* of the compression spring.

The bias member 86 is configured to apply a biasing force to the stem body 82 in the proximal direction. In other words, the bias member 86, when compressed, can urge the stem body 82 to advance proximally relative to the outlet portion 22.

By rotationally retracting the collar 14 toward the distal body 50 of the housing 12, the end cap 70 of the collar 14 can press against the arms 96*b* of the stem body 82, thus urging the stem body 82 to move distally. Accordingly, the bias member 86 can be compressed and generate a bias force in the proximal direction to resist the compression.

On the other hand, the collar 14 can be in its neutral position when the stem body 82, urged by the bias member 86, is advanced to its most proximal position. As noted above, the proximal advancement of the stem body 82 relative to the outlet portion 22 can be limited by the proximal end 56*p* of the slots 56. In such neutral position, the stem body 82 does not exert forward pressure to the collar 14. In some embodiments, the bias member 86 can return to its unbiased position (e.g., the compression spring can return to its original length).

In some embodiments, the stem plug 84 can be made of an elastomeric material. As shown in FIGS. 7-11, 14, 17 and 20, the stem plug 84 can be coupled to the distal end 94*d* of the stem body 94. The stem plug 84 can have a semi-spherical shape and its outer diameter is larger than that of the orifice 46 in the transition region 32. Thus, when the stem body 82 is urged to move distally by retracting the collar 14, at least a portion of the outer surface of the stem plug 84 can extend past the distal end 86*d* of the bias member 86 and engage the sloped surface 44 at the transition region 32, thus effectively plug the orifice 46 and prevent fluid flow between the distal lumen 28 and the proximal lumen 30.

The distal end 56*d* of the slots 56 is located in a position which allows the stem body 82 to move distally at least to the extent where the stem plug 84 can seal the orifice 46. In the depicted embodiments (see e.g., FIG. 20), when the collar 14 is retracted to the most distal position such that the distal end 14*d* of the collar 14 abuts the outer shoulder 52 of the distal body 50, the stem plug 84 is so positioned as to plug the orifice 46.

Sheath

The sheath 16 can include a generally tubular body that is made of an elastically deformable material. As shown in FIGS. 1-5 and 12-20, the sheath 16 can be mounted on the collar 14 and engage with the stem assembly 18 to form a bite valve. In the depicted embodiments, the sheath 16 is stationary relative to collar 14 except for elastic deformation of the sheath 16 caused by biting or pinching. Thus, rotational and/or axial movement of the collar 14 is also accompanied by corresponding rotational and/or axial movement of the sheath 16.

The proximal end 16*p* of the sheath 16 has an aperture 97 forming a valve seat that contacts the perimeter of the disk 87 to create a seal. The opposite distal end 16*d* of the sheath 16 can also be sealed around the perimeter of the collar 14 such that fluid does not readily exit the valve 10 through the sheath 16 under passive conditions. The sheath 16 also has a chamber 98 located between the proximal end 16*p* and the distal ends 16*d*, and at least a portion of the chamber 98 has a larger diameter than the disk 87 of the stem tip 80.

However, the proximal end 16*p* of the sheath 16 can selectively be separated from the perimeter of the disk 87 to allow fluid flow, such as by biting down or pinching on the outside of the sheath 16 around the neck 88 or by increasing the fluid pressure within the sheath 16. Thus, in the configuration of FIG. 5, the valve 10 is ready for a user to selectively access fluid when needed by biting on the sheath 16 to open the bite valve. More information regarding exemplary bite valve mechanics and components are described, for example, in U.S. Pat. No. 9,534,695, which is hereby incorporated by reference in its entirety.

Operation of the Valve

By moving the collar 14 and the sheath 16 mounted on the collar 14 axially relative to the housing 12, the multi-position valve 10 can feature at least three different operation modes including a free-flow mode for venting the fluid (see e.g., FIGS. 12-14), a bite-valve mode for hands-free hydration (see e.g., FIGS. 15-17) and an OFF mode for prevention of inadvertent leaking (see e.g., FIGS. 18-20).

In the OFF mode as illustrated in FIGS. 18-20, the collar 14 and the sheath 16 mounted on the collar 14 are retracted to the most distal position where the distal end 14*d* of the collar 14 abuts the outer shoulder 52 of the distal body 50. By pressing against the arms 96*b* of the stem body 82, the end cap 70 of the collar 14 pushes the stem body 82 (against the resistance of the bias member 86) to its most distal position where the stem plug 84 can plug the orifice 46. Thus, fluid flow between the distal lumen 28 and the proximal lumen 30 is inhibited.

In the depicted embodiments, the total length of the stem tip 80 and the stem body 82 is configured such that when the stem plug 84 engages the sloped surface 44 and seals the orifice 46, the disk 87 of the stem tip 80 also engages the periphery of the aperture 97 of the sheath 16 to form a seal, thus further preventing fluid leakage from the valve 10.

In some embodiments, the collar 14 can frictionally engage the proximal body 48 so as to counter the bias force applied to the stem body 82 by the bias member 86, thus preventing the stem body 82 and the coupled collar 14 from moving in the proximal direction and causing unintentional disengagement from the OFF mode.

In some embodiments (not shown), there can be a set of complimentarily arranged bumps and indents located on the interior of the collar 14 and the exterior of the outlet portion 22 that provide friction points when the valve 10 is in the bite-valve mode. For example, the collar 14 can have a plurality of bumps extending radially inwardly from the sidewall 68 of the central lumen 62 and the outer surface of the proximal body 48 can have a plurality of indents configured to respectively engage the corresponding bumps when the valve 10 is in the bite-valve mode. Alternatively, the collar 14 can have a plurality of indents on the sidewall 68 and the outer surface of the proximal body 48 can have a plurality of bumps configured to respectively engage the corresponding indents when the valve 10 is in the bite-valve mode.

In other embodiments (not shown), the valve 10 can include a locking mechanism that can be activated to secure the collar 14 at its most distal position, thus keeping the orifice 46 plugged by the stem plug 84, despite the bias force exerted by the bias member 86. The locking mechanism can be deactivated to allow the collar 14 and the coupled stem assembly 18 to move proximally relative to the housing 12. In some embodiments, deactivation of the locking mechanism can cause the stem assembly 18 to spring forward until the proximal advancement of the stem body 82 is limited by the proximal end 56*p* of the slots 56 (or the bias member 86 returns to its unbiased position), thereby causing the collar 14 (together with the sheath 16 mounted thereon) to move to its neutral position.

In the bite-valve mode as illustrated in FIGS. 15-17, the aperture 97 remains sealed whereas the orifice 46 is unplugged. Specifically, in the bite-valve mode, the collar 14 is in the neutral position, and the stem body 82 is urged to a more proximal position such that the stem plug 84, which is coupled to the distal end 94d of the shaft 94, is moved away from the orifice 46. Thus, fluid in the distal lumen 28 of the housing 12 can flow into the proximal lumen 30 of the housing 12 and the central lumen 52 of the collar 14. Through the proximal opening 78 of the collar 14, fluid in the central lumen 52 and the proximal lumen 30 can then flow into the chamber 98 of the sheath 16.

As the valve 10 is changed from the OFF mode to the bite-valve mode, the stem assembly 18, the collar 14, and the sheath 16 move together in the proximal direction relative to the housing 12. Thus, the proximal end 16p of the sheath 16 remains aligned with the disk 87 of the stem tip 80. Accordingly, the disk 87 can remain engaged with the periphery of the aperture 97 of the sheath 16 to seal the fluid inside the chamber 98. However, selective deformation of the sheath 16 by biting or pinching in the sheath 16 round the neck 88 can disrupt the seal between the disk 87 and the sheath 16, allowing fluid to flow out through the aperture 97 as long as the orifice 46 remains unplugged.

In the free-flow mode as illustrated in FIGS. 12-14, both the aperture 97 and the orifice 46 are unsealed. Specifically, the collar 14 is advanced further proximally from its neutral position. In some embodiments, the collar 14 can advance to its most proximal position which can be defined by the proximal end 54p of the external thread 54, as noted above. The stem assembly 18, however, can stay in place (as in the bite-valve mode) because the proximal end 56p of the slots 56 limits the proximal movement of the stem body 82. Accordingly, the disk 87 of the stem tip 80 can disengage from the aperture 97 and is positioned distal to the proximal end 16p of the sheath 16, allowing fluid in the chamber 98 to flow out of the sheath 16 through the aperture 97. Thus, in the free-flow mode, fluid can flow freely through the whole valve 10 in a continuous passageway including, e.g., the inlet conduit 24, the opening 36, the distal lumen 28, the orifice 46, the proximal lumen 30, the central lumen 62, the proximal opening 78, the chamber 98, and the aperture 97.

As illustrated in FIGS. 12-20, one or more markers can be placed on the collar 14 and/or the housing 12 to facilitate operation of the valve 10. For example, the external surface of the housing 12 can have one or more markers 99h that correspond to one or more markers 99c on the collar 14 to respectively indicate the position of the collar 14 relative to the housing 12 for three operation modes: OFF, bite-valve, and free flow. In some embodiments, the markers 99h and/or 99c can be color coded. In some embodiments, the markers 99h and/or 99c can be displayed as icons and/or texts. Thus, switching between the three operation modes can be achieved by rotational and/or axial movement of the collar 14 relative to the housing 12, wherein such movement can be precisely controlled by aligning one of the markers 99h to a corresponding marker 99c.

General Considerations

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Integers, characteristics, materials, and other features described in conjunction with a particular aspect, embodiment, or example of the disclosed technology are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods.

As used herein, the terms "a", "an", and "at least one" encompass one or more of the specified element. That is, if two of a particular element are present, one of these elements is also present and thus "an" element is present. The terms "a plurality of" and "plural" mean two or more of the specified element. As used herein, the term "and/or" used between the last two of a list of elements means any one or more of the listed elements. For example, the phrase "A, B, and/or C" means "A", "B,", "C", "A and B", "A and C", "B and C", or "A, B, and C." As used herein, the term "coupled" generally means physically coupled or linked and does not exclude the presence of intermediate elements between the coupled items absent specific contrary language.

The invention claimed is:

1. A valve assembly, comprising:
a housing;
a collar movably coupled to the housing;
a sheath coupled to the collar; and
a stem assembly positioned inside the housing, the collar, and the sheath;
wherein the collar is axially moveable relative to the housing between a first position, a second position, and a third position;
wherein when the collar is in the first position, the stem assembly is configured to block a fluid inside a lumen of the housing from flowing into a lumen of the collar;
wherein when the collar is in the second position, the stem assembly is configured to allow the fluid to flow from the lumen of the housing through the lumen of the collar and into a chamber of the sheath, and when the collar is in the second position the stem assembly is further configured to:

(i) retain the fluid inside the chamber of the sheath when an aperture of the sheath is blocked by the stem assembly, or (ii) allow the fluid to flow out of the sheath through the aperture when the sheath is selectively deformed around the stem assembly; and wherein when the collar is in the third position, the stem assembly is configured to allow the fluid to flow from the lumen of the housing through the lumen of the collar, into the chamber of the sheath, and then out of the sheath unobstructed through the aperture.

2. The valve assembly of claim 1, wherein the stem assembly comprises a bias member which can be compressed to a biased position by moving the collar toward the housing or return to an unbiased position by pushing the collar away from the housing.

3. The valve assembly of claim 2, wherein the collar is in the first position when the bias member is in the biased position, and the collar is in the second or third position when the bias member is in the unbiased position.

4. The valve assembly of claim 2, wherein the stem assembly comprises a stem body coupled to the bias member, wherein the stem body comprises a protruding member extending into and moveable within a slot of the housing, the slot having a proximal end and a distal end.

5. The valve assembly of claim 4, wherein the distal end of the slot is so positioned that it allows the stem body to move distally at least to an extent where a plug of the stem assembly can seal an orifice of the lumen of the housing.

6. The valve assembly of claim 1, wherein a distal end portion of the stem assembly comprises a plug and a proximal end portion of the stem assembly comprises a disk;

wherein when the collar is in the first position, the plug of the stem assembly is configured to seal an orifice of the lumen of the housing;

wherein when the collar is in the second position, the plug of the stem assembly is in an unseated position relative to the orifice of the lumen of the housing and the disk of the stem assembly is configured to seal the aperture of the sheath; and wherein when the collar is in the third position, the plug of the stem assembly is in the unseated position relative to the orifice of the lumen of the housing and the disk of the stem assembly is in an unsealed position relative to the aperture of the sheath.

7. The valve assembly of claim 1, wherein the collar is threadably coupled to a body portion of the housing such that rotating the collar in a first direction causes the collar to move distally relative to the housing and rotating the collar in a second direction that is opposite to the first direction causes the collar to move proximal relative to the housing.

8. The valve assembly of claim 1, wherein the collar comprises a pin extending into and moveable within a slot located on the housing, the slot having a proximal end and a distal end.

9. The valve assembly of claim 8, wherein the collar is in the first position when the pin of the collar is moved to the distal end of the slot, and the collar is in the third position when the pin of the collar is moved to the proximal end of the slot.

10. The valve assembly of claim 9, wherein the collar is in the second position when the pin of the collar is moved to an intermediate point that is between the proximal end and the distal end of the slot.

11. A valve assembly, comprising:
a housing;
a collar movably coupled to the housing;
a sheath fixedly coupled to the collar; and
a stem assembly fixedly coupled to the housing;

wherein the stem assembly comprises a bias member which can be compressed to a biased position by moving the collar toward the housing or return to an unbiased position by pushing the collar away from the housing;

wherein when the bias member is in the biased position, the stem assembly is configured to block a fluid inside a lumen of the housing from flowing into a lumen of the collar;

wherein when the bias member is in the unbiased position, the stem assembly is configured to allow the fluid to flow from the lumen of the housing through the lumen of the collar and into a chamber of the sheath;

wherein the collar is configured to be moveable between a first position and a second position;

wherein when the collar is in the first position, the stem assembly is configured to:

(i) retain the fluid inside the chamber of the sheath when an aperture of the sheath is blocked by the stem assembly, or (ii) allow the fluid to flow out of the sheath through the aperture when the sheath is selectively deformed around the stem assembly; and wherein when the collar is in the second position, the stem assembly is configured to allow the fluid to flow out of the sheath unobstructed through the aperture.

12. The valve assembly of claim 11, wherein a distal end portion of the stem assembly comprises a plug and a proximal end portion of the stem assembly comprising a disk;

wherein when the bias member is in the biased position, the plug of the stem assembly is configured to seal an orifice of the lumen of the housing;

wherein when the collar is in the first position, the plug of the stem assembly is in an unseated position relative to the orifice of the lumen of the housing and the disk of the stem assembly is configured to seal the aperture of the sheath; and wherein when the collar is in the second position, the plug of the stem assembly is in the unseated position relative to the orifice of the lumen of the housing and the disk of the stem assembly is in an unsealed position relative to the aperture of the sheath.

13. The valve assembly of claim 11, wherein the housing comprises an inlet portion and an outlet portion, the inlet portion being pivotably coupled to the outlet portion, wherein the inlet portion comprises an inlet conduit that can be fluidly coupled to a fluid reservoir, and the outlet portion comprises an outlet conduit that is fluidly coupled to the inlet conduit.

14. The valve assembly of claim 11, wherein when the bias member is in the biased position, the collar is configured to frictionally engage a body portion of the housing so as to counter a bias force applied by the bias member so as to prevent the collar from moving away from the housing.

15. The valve assembly of claim 14, further comprising a set of complimentarily arranged bumps and indents located on the collar and the housing so as to provide friction points when the bias member is in the biased position.

16. The valve assembly of claim 11, wherein the housing comprises one or more magnetic members that are configured for releasably attaching the valve assembly to a complementary magnetic surface.

17. A valve assembly, comprising:
a housing comprising a lumen having an orifice;

a collar movably coupled to the housing;

a sheath fixedly coupled to the collar; and a stem assembly fixedly coupled to the housing, a distal end portion of the stem assembly comprising a plug and a proximal end portion of the stem assembly comprising a disk;

wherein the collar is configured to be axially moveable relative to the housing between a first position, a second position, and a third position;

wherein when the collar is in the first position, the plug of the stem assembly is configured to seal the orifice of the lumen of the housing;

wherein when the collar is in the second position, the plug of the stem assembly is in an unseated position relative to the orifice of the lumen of the housing and the disk of the stem assembly is configured to seal an aperture of the sheath; and wherein when the collar is in the third position, the plug of the stem assembly is in the unseated position relative to the orifice of the lumen of the housing and the disk of the stem assembly is in an unsealed position relative to the aperture of the sheath.

18. The valve assembly of claim 17, wherein the stem assembly comprises a bias member which can be compressed to a biased position by moving the collar toward the housing or return to an unbiased position by pushing the collar away from the housing, wherein the collar is in the first position when the bias member is in the biased position, and the collar is in the second or third position when the bias member is in the unbiased position.

19. The valve assembly of claim 17, wherein when the collar is in the first position, a distal end of the collar abuts a shoulder which extends outwardly from an outer surface of the housing, wherein when the collar is in the second position, the distal end of the collar is separated from the shoulder by a first predefined distance, and wherein when the collar is in the third position, the distal end of the collar is separated from the shoulder by a second predefined distance, the second predefined distance being larger than the first predefined distance.

20. The valve assembly of claim 17, wherein the collar is rotatably coupled to a portion of the housing such that rotating the collar in a first direction causes the collar to move distally relative to the housing and rotating the collar in a second direction that is opposite to the first direction causes the collar to move proximal relative to the housing; and wherein an external surface of the housing comprises a marker and an external surface of the collar comprises a complementary marker, wherein an alignment of the marker on the housing with the complementary marker on the collar indicates that the collar is in the first position, the second position, or the third position.

* * * * *